Patented Aug. 11, 1931

1,817,969

UNITED STATES PATENT OFFICE

ROY CROSS, OF KANSAS CITY, MISSOURI, ASSIGNOR TO CROSS DEVELOPMENT CORPORATION, A CORPORATION OF DELAWARE

METHOD OF TREATING PETROLEUM HYDROCARBONS

No Drawing.   Application filed August 28, 1924.   Serial No. 734,735.

This invention relates to improvements in a method of treating petroleum hydrocarbon and refers more particularly to a method in which hydrocarbon oils are refined or purified to remove therefrom objectionable or deleterious matter such as resins, sulphur compounds and other material which renders the final product objectionable as a marketable oil.

Among the salient objects of the invention are to provide a method in which oil is treated to a relatively concentrated acid treat and without water washing immediately subjected to treatment with a highly adsorptive agent in order to remove not only the acid but also the objectionable material in the oil; to provide a method of treating petroleum hydrocarbons in which after the acid treat and treatment with the adsorptive material the oil is finally subjected to a filtering action in order to separate the adsorptive material from the hydrocarbons; to provide a method in which a metal salt having an affinity for the sulphur compounds may be used with the adsorptive material in order to facilitate the removal of the sulphur compounds in the oil and in general to provide a method hereinafter explained in more detail.

One of the most difficult problems in connection with the treatment of hydrocarbon oils is the removal of certain deleterious material such as sulphur compounds and other impurities which not only produce discoloration which is difficult to eliminate but also develop discoloration in the oil on standing and particularly where the oil is subjected to a strong light. This problem has become rather acute since the somewhat general adoption of visible pumps in which discoloration of the oil is exposed to the customer and often renders the oil nonmarketable.

The oil particularly adapted to this treatment is overhead distillate which may include a naptha and kerosene cuts. Gasline having an end boiling point of approximately 437° F. obtained direct from bubble towers of a cracking plant produces a finished product which is admirably suited to this method of refining. The oil is first subjected to an acid treat, preferably sulphuric acid from 60° Bé. to 66° Bé. The oil is kept as cool as possible during the acid treatment to retard polymerization. The usual method of treatment may be used but it is desirable to have a continuous treatment in which the oil is pumped through a series of tanks, the acid being slowly circulated in a counterflow stream. The acid is pumped into one end of a series of tanks or agitators, having overflow lines connecting the successive stages and adapted to maintain the acid at a constant level in the separate stages. The oil is introduced into the bottom of the final tank into which the acid overflows percolating or bubbling up through the acid and over flowing into a line which is connected into the bottom of the next succeeding tank wherein a pool of acid is maintained, thus the oil is circulated in a counterflow stream bubbling up in the separate stages through the acid bodies. By this counterflow method it is very rare that as much as five pounds of new acid is required per barrel of oil to be treated.

If the oil is kept cool as suggested there is practically no polymerization and in fact it is desirable to keep both the acid and oil as cool as possible. This may be done by using brine coils or any other suitable method. The essential factor is, however, that following the acid treatment no water is added for washing out the acid. The acid treated oil is allowed to settle and is then agitated in a suitable mixing device or agitator with an adsorptive material such as dried natural clay, charcoal, adsorptive carbon, silica gel, fuller's earth, bone black or other suitable adsorptive materials.

It is important in all cases that this treating material be perfectly dry as the presence of water either in the material or due to water washing for the removal of acid tends to produce a sludgy bottom containing the impurities of the oil such as resins and the like and which in this state are readily reabsorbed in the treated oil. The elimination of water effectively does away with this difficulty of the readsorption of the impurities by the oil as they are permanently adsorbed from the oil by the dry treating material. Another quite suitable natural material is Death Valley clay or bentonite which has been ignited at a temperature of from 250° F. to 900° F. This material should preferably be of a degree of fineness so that a substantial portion of it passes a 200 mesh screen. The amount of clay or other adsorptive material required for satisfactory treatment varies, of course, with the character of the oil and the amount of impurities to be removed. Ordinarily from one-tenth of a pound up to ten pounds per barrel, depending on its adsorptive qualities and character of the oil to be treated, is sufficient. It is necessary that the oil be treated with the adsorptive material before it has been affected by too long standing with the sulphuric acid. Likewise it is important that the clay or adsorptive material after being contacted with the acid treated oil be immediately removed from the oil by filtration. This may be accomplished by any type of efficient filter such as the Sweetland filter or the International filter. A preliminary settling may be carried out in a large shallow tank after which the supernatent oil is immediately pumped through the filter to storage.

In many cases with the above treatment the oil is not sweet to the doctor test or in other words it is discolored more or less by the addition of sodium plumbite and flowers of sulphur. Furthermore it may not stand the requirements of motor gasoline known as the copper corrosion test as specified by the U. S. Government for motor gasoline in paper #323A of the U. S. Bureau of Mines. To overcome this difficulty the clay or other adsorptive material are treated with metal salts such as copper, lead, manganese, bismuth and other metals which have an affinity for the copper compounds. This method of combining the adsorptive material with a metal salt has been clearly described in my Patent No. 1,515,733, issued November 18th, 1924. The amount of such metal salts to be added should be equivalent to the amount of mercaptans or alkyl sulphides present in the oil as indicated by the sulphur content.

It has been found that a very good adsorptive material is silica gel, containing 1% of copper in the form of copper oxide or copper zeolite. A very satisfactory salt to use is copper acetate which forms an extremely active reagent in conjunction with silica gel or clay. Other metal salts as well have been effectively used with silica gel for the elimination of these objectionable compounds.

Further advantage of this treatment is that the oil in warm weather and when exposed to strong sunlight in visible pumping does not precipitate or go off color. In all cases to get the desired result it is important to eliminate the moisture during the treatment with the clay and to eliminate water as well in connection with the acid treat. It has been found that the addition of water in either stage of treatment greatly reduces the activity of the material. It is important also to carry out the treatment rapidly thus preventing excessive contacting of either acid or clay and by eliminating progressively polymerization.

This method is particularly adapted to the treatment of raw gasoline obtained by the Cross process of cracking. The product recovered from the bubble tower consists of liquid substantially within the boiling point range of gasoline, and it is desirable to make this liquid marketable under the most rigid specifications without distillation. While gasoline distillate is particularly adapted to be treated by the method described, kerosene, napthas and other petroleum hydrocarbons are likewise effectively refined by them.

The use of the refining or adsorptive material may be reactivated by burning in order to remove the acid and impurities. The temperature ranging from 800° F. to 900° F. more or less.

I claim as my invention:

1. A method of treating hydrocarbon oil which consists in contacting the oil with sulphuric acid, contacting the acid treated oil without water washing with inorganic adsorptive materials mixed with a metallic compound having an affinity for the sulphur compounds and separating the refined oil from the treating materials.

2. A method of treating hydrocarbon oils which consists in contacting the oils with sulphuric acid and then contacting the acid treated oil without the addition of water with a gel containing an intimate mixture of highly adsorptive clay and a metal salt having an affinity for the sulphur compounds and separating the refined oil from the treating materials.

3. A method of treating hydrocarbon oil, which consists in rapidly contacting the oil with sulphuric acid, contacting the acid treated oil without water washing with a gel containing a highly adsorptive inorganic material and a metal compound having an affinity for the sulphur compounds of the oil, and separating the refined oil from the treating materials.

4. A method of treating hydrocarbon oil, which consists in rapidly contacting the oil with sulphuric acid, contacting the acid treated oil without water washing with a highly adsorptive gelatinizable inorganic material containing particles of a metal compound in the inorganic material, separating the refined oils from the treating materials.

5. A method of treating hydrocarbon oil of low viscosity which consists in intimately and rapidly contacting the oil with sulphuric acid and limiting the contacting period to prevent polymerization, subjecting the mixture to a refrigerating action during the acid contacting period, and contacting the acid treated oil with an adsorptive material and separating the refined oil and treating materials.

6. A method of treating hydrocarbon oils of low viscosity which consists in rapidly contacting the oil with sulphuric acid and limiting the contacting time to prevent polymerization, subjecting the oil during the acid contacting period to a refrigerating action, contacting the acid treated oil without water washing with a gel containing a highly adsorptive inorganic material and separating the refined oil from the treating materials.

7. A method of treating hydrocarbon oils which consists in rapidly contacting the oil with sulphuric acid and limiting the contacting time to prevent polymerization, subjecting the oil during the acid contacting period to a refrigerating action, contacting the acid treated oil without water washing with a gel containing a highly adsorptive inorganic material and a metal compound having an affinity for the sulphur compounds of the oil and separating the refined oil from the treating materials.

ROY CROSS.